US007293007B2

(12) United States Patent
Ma et al.

(10) Patent No.: US 7,293,007 B2
(45) Date of Patent: Nov. 6, 2007

(54) METHOD AND SYSTEM FOR IDENTIFYING IMAGE RELATEDNESS USING LINK AND PAGE LAYOUT ANALYSIS

(75) Inventors: Wei-Ying Ma, Beijing (CN); Ji-Rong Wen, Beijing (CN); Xiaofei He, Chicago, IL (US); Deng Cai, Beijing (CN)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/834,483

(22) Filed: Apr. 29, 2004

(65) Prior Publication Data
US 2005/0246623 A1 Nov. 3, 2005

(51) Int. Cl.
*G06F 7/00* (2006.01)
(52) U.S. Cl. ......................................... 707/1
(58) Field of Classification Search ................ 707/1
See application file for complete search history.

(56) References Cited

U.S. PATENT DOCUMENTS

| | | | |
|---|---|---|---|
| 5,546,517 A | 8/1996 | Marks et al. | |
| 6,112,202 A | 8/2000 | Kleinberg | |
| 6,665,837 B1 | 12/2003 | Dean et al. | |
| 6,901,411 B2 * | 5/2005 | Li et al. | 707/104.1 |
| 2003/0004966 A1 * | 1/2003 | Bolle et al. | 707/104.1 |
| 2003/0149704 A1 * | 8/2003 | Yayoi et al. | 707/102 |
| 2003/0208482 A1 * | 11/2003 | Kim et al. | 707/3 |
| 2003/0225763 A1 | 12/2003 | Guilak et al. | |

FOREIGN PATENT DOCUMENTS

EP 0 964 340 A2 12/1999

OTHER PUBLICATIONS

Yu, Shipeng, Deng Cai, Ji-Rong Wen and Wei-Ying Ma, "Improving Pseudo-Relevance Feedback in Web Information Retrieval Using Web Page Segmentation," WWW May 20-24, 2003 Budapest, Hungary, ACM 2003.
Lin, Shian-Hua and Jan-Ming Ho, "Discovering Information Content Blocks from Web Documents," SIGKDD Jul. 23-26, 2002, Edmonton, Alberta, Canada, ACM 2002.
Yi, Lan, Bing Liu and Xiaoli Li, "Eliminating Noisy Information in Web Pages for Data Mining," SIGKDD Aug. 24-27, 2003 Washington, D.C., ACM 2003.

(Continued)

*Primary Examiner*—Don Wong
*Assistant Examiner*—Angela M Lie
(74) *Attorney, Agent, or Firm*—Perkins Coie LLP

(57) ABSTRACT

A method and system for determining relatedness of images of pages based on link and page layout analysis. A link analysis system determines relatedness between images by first identifying blocks within web pages, and then analyzing the importance of the blocks to web pages, web pages to blocks, and images to blocks. Based on this analysis, the link analysis system determines the degree to which each image is related to each other image. The link analysis system may also use the relatedness of images to generate a ranking of the images. The link analysis system may also generate a vector representation of the images based on their relatedness and apply a clustering algorithm to the vector representations to identify clusters of related images.

14 Claims, 6 Drawing Sheets

OTHER PUBLICATIONS

Lin, Wei-Hao, Rong Jin and Alexander Hauptmann, "Web Image Retrieval Re-Ranking with Relevance Model," IEEE/WIC International Conference on Web Intelligence, IEEE 2003.

Harmandas, V., M. Sanderson and M.D. Dunlop, "Image retrieval by hypertext links," SIGIR 97 Philadelphia, PA, ACM 1997.

Shen, Heng Tao, Beng Chin Ooi and Kian-Lee Tan, "Finding Semantically Related Images in the WWW," ACM Multimedia 2000 Los Angeles CA, ACM 2000.

European Search Report for European Patent Application No. 05103485.8, Aug. 22, 2005 (6 pages).

Cheng, Pu-Jen and Chien, Lee-Feng, "Auto-Generation of Topic Hierarchies for Web Images from Users' Perspectives," CIKM '03, Nov. 3-8, 2003, New Orleans, Louisiana, Copyright 2003 (4 pages).

Cai, Deng et al., "Block-Level Link Analysis," Copyright 2004 (8 pages).

Chen, Yu et al. "Detecting Web Page Structure for Adaptive Viewing on Small Form Factor Devices" (18 pages) http://www2003.org/cdrom/papers/refereed/p297/p297-chen.htm [Accessed Apr. 27, 2004].

Wang, Yitong and Kitsuregawa, Masaru, "Evaluating Contents-Links Coupled Web Page Clustering for Web Search Results," CIKM '02, Nov. 4-9, 2002, McLean, Virginia, Copyright 2002 (8 pages).

Bernard, Kobus et al., "Matching Words and Pictures," Journal of Machine Learning Research 3, 2003 (29 pages).

The PageRank Citation Ranking: Bringing Order to the Web, Jan. 29, 1998 (17 pages).

Lempel, Ronny and Soffer, Aya, PicASHOW: Pictorial Authority Search by Hyperlinks on the Web, Copyright May 1-5, 2001, Hong Kong (11 pages).

Davison, Brian D., "Toward a Uniification of Text and Link Analysis," Copyright SIGIR '03, Jul. 28-Aug. 1, 2003, Toronto, Canada (2 pages).

Mukherjea, Sougata et al., "Using Clustering and Visualization for Refining the Results of a WWW Image Search Engine," Copyright ACM 2000 (7 pages).

Cai, Deng, VIPS: a Vision-based Page Segmentation Algorithm, Microsoft Research, Technical Report, Nov. 1, 2003 (29 pages).

He, Xiaofei, "ImageSeer: Clustering and Searching WWW Images Using Link and Page Layout Analysis," Copyright 2004, May 17-22, 2004, New York (11 pages).

* cited by examiner

METHOD AND SYSTEM FOR IDENTIFYING IMAGE RELATEDNESS USING LINK AND PAGE LAYOUT ANALYSIS

TECHNICAL FIELD

The described technology relates generally to analyzing web pages and particularly to relatedness of images of web pages.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling and indexing" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service then ranks the web pages of the search result based on the closeness of each match, web page popularity (e.g., Google's PageRank), and so on. The search engine service may also generate a relevance score to indicate how relevant the information of the web page may be to the search request. The search engine service then displays to the user links to those web pages in an order that is based on their rankings.

Although many web pages are graphically oriented in that they may contain many images, conventional search engine services typically search based on only the textual content of a web page. Some attempts have been made, however, to support image-based searching of web pages. For example, a user viewing a web page may want to identify other web pages that contain images related to an image on that web page. The image-based search techniques are typically either content-based or link-based and additionally use surrounding text to aid in analyzing images. The content-based techniques use low-level visual information for image indexing. Because the content-based search techniques are very computationally expensive, they are not practical for image searching on the web.

The link-based search techniques typically assume that images on the same web page are likely to be related and that images on web pages that are each linked to by the same web page are related. Unfortunately, these assumptions are incorrect in many situations primarily because a single web page may have content relating to many different topics. For example, a web page for a news web site may contain content relating to an international political event and content relating to a national sporting event. In such a case, it is unlikely that a picture of a sports team relating to the national sporting event is related to a web page linked to by the content relating to the international political event.

It would be desirable to have an image-based search technique that would not be computationally as expensive as conventional content-based search techniques and that, unlike conventional link-based search techniques, would account for the diverse topics that can occur on a single web page.

SUMMARY

A system for determining relatedness of images of pages based on link and page layout analysis is provided. A link analysis system determines relatedness between images by first identifying blocks within pages, and then analyzing the importance of the blocks to pages, pages to blocks, and images to blocks. Based on this analysis, the link analysis system determines the degree to which each image is related to each other image. Because the relatedness of an image to another image is based on block-level importance, which is a smaller unit than a page, rather than page-level importance, this relatedness is a more accurate representation of relatedness than conventional link-based search techniques.

DETAILED DESCRIPTION

A method and system for determining relatedness of images of pages based on link and page layout analysis is provided. In one embodiment, a link analysis system determines relatedness between images by first identifying blocks within web pages, and then analyzing the importance of the blocks to web pages, web pages to blocks, and images to blocks. Based on this analysis, the link analysis system determines the degree to which each image is related to each other image. A block of a web page represents an area of the web page that appears to relate to a similar topic. For example, a news article relating to an international political event may represent one block, and a news article relating to a national sporting event may represent another block. The importance of a block to a page may indicate a probability that a user will focus on that block when viewing that page. The importance of a page to a block may indicate the probability that a user will select from that block a link to that page. The importance of an image to a block may indicate the probability that a user will focus on that image when viewing that block. After calculating a numeric indicator of these importances for pairs of pages and blocks and pairs of images and blocks, the link analysis system generates an indicator of the relatedness of each image to each other image by combining the calculated importance of a block to a page, the calculated importance of a page to a block, and the calculated importance of an image to a block. Because the relatedness of an image to another image is based on block-level importance rather than on page-level importance, this relatedness is a more accurate representation of relatedness than conventional link-based search techniques.

The link analysis system may also use the relatedness of images to generate a ranking of the images. The ranking may be based on a probability that a user who starts viewing an arbitrary image will transition to another image after an arbitrarily large number of transitions between images. The link analysis system may also generate a vector representation of the images based on their relatedness and apply a clustering algorithm to the vector representations to identify clusters of related images.

Figure 1:
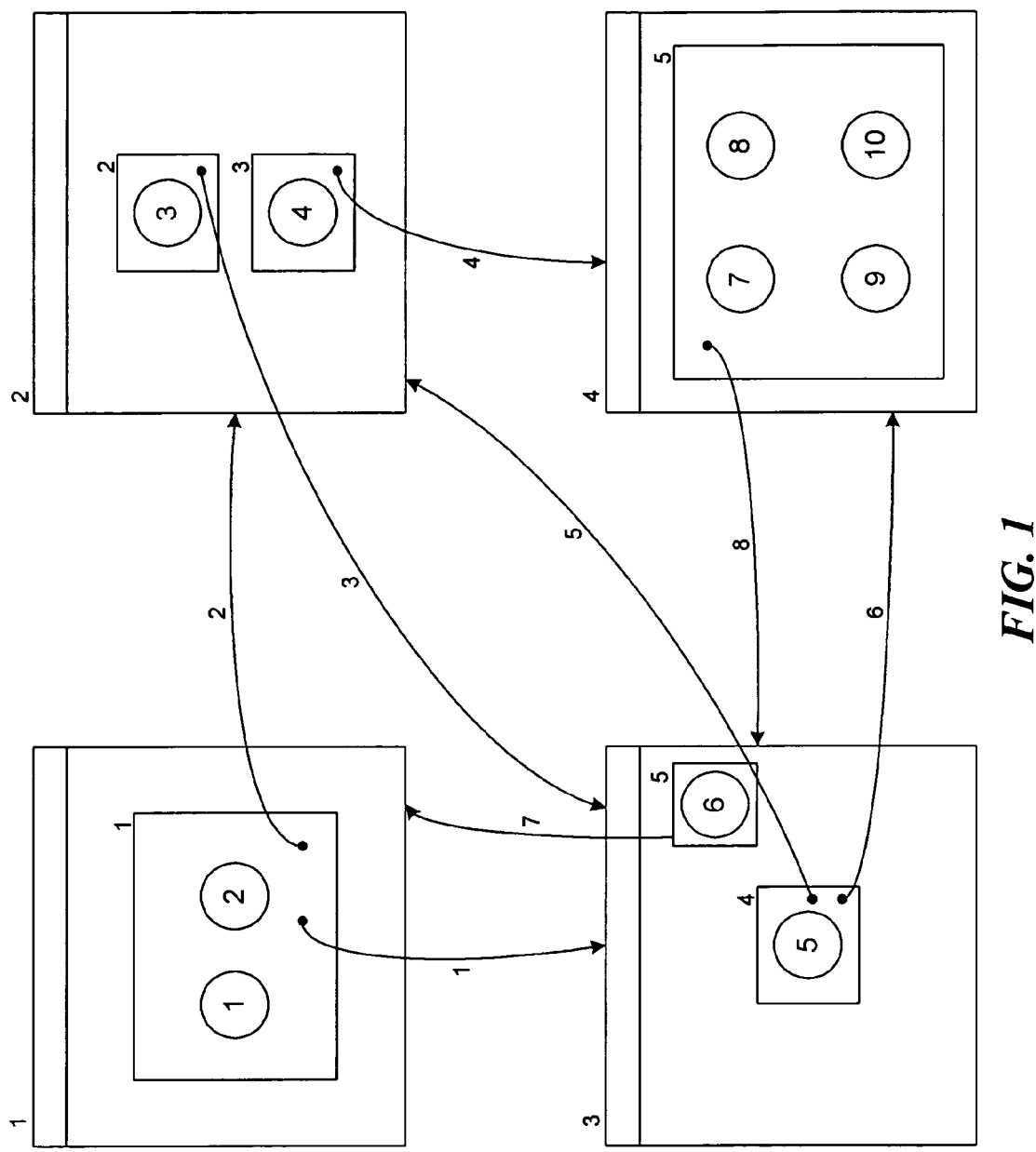
FIG. 1 is a block diagram illustrating blocks, images, and links in a sample collection of web pages.

FIG. 1 is a block diagram illustrating blocks, images, and links in a sample collection of web pages. This collection of web pages includes web pages 1-4. The blocks within the web pages are represented as rectangles, the images within blocks are represented as circles, and the links within blocks are represented as directed arrows from a block to a linked-to web page. Web page 1 contains block 1, which contains images 1 and 2 and links 1 and 2. Web page 2 contains block 2, which contains image 3 and link 3, and block 3, which contains image 4 and link 4. Web page 3 contains block 4, which contains image 5 and links 5 and 6, and block 5, which contains image 6 and link 7. Web page 4 contains block 5, which contains images 7, 8, 9, and 10 and link 8. Because the link analysis system bases image relatedness on blocks rather than entire web pages, the relatedness of an image to other images is likely based on a more accurate representation of the topic of an image. For example, web page 2 contains blocks 2 and 3, which may be directed to different topics such as an international political event and a national sporting event, respectively. The link analysis system may identify that image 4 is more closely related to the images of web page 4 than to the images of web page 3, because block 3, which contains image 4, has a link 4 to web page 4. For example, web page 4 is more likely sports-related than is web page 3 because block 3 contains a link to web page 4, but not to web page 3. As such, image 4 is more likely related to images 7, 8, 9, and 10 than to images 5 and 6 of web page 3. Techniques that are not based on block-level analysis may identify that image 4 is equally related to web page 3 and web page 4 because those techniques do not distinguish block 2 from block 3 on web page 2.

In one embodiment, the link analysis system calculates the importance of a page to a block, for each block and page combination, as the probability that a user who selects a link of that block will select a link to that page. If a block does not have a link to a page, then the probability is zero. If a block has a link to a page, then the link analysis system may assume a user will select each of the links of the block with equal probability. A block-to-page matrix of probabilities is defined by the following equation:

$$Z_{ij} = \begin{cases} 1/s_i & \text{if there is a link from block } i \text{ to page } j \\ 0 & \text{otherwise} \end{cases} \quad (1)$$

where $Z_{ij}$ represents the probability that a user who selects a link of block i will select the link to page j and $s_i$ is the number of links in block i. The block-to-page matrix Z for the web pages of FIG. 1 is shown in Table 1. The rows of Table 1 represent the blocks and the columns represent the pages. In this example, the probability that a user who selects of link of block 4 will select a link to web page 2 is 0.5.

TABLE 1

|   | 1 | 2  | 3  | 4  |
|---|---|----|----|----|
| 1 |   | .5 | .5 |    |
| 2 |   |    | 1  |    |
| 3 |   |    |    | 1  |
| 4 |   | .5 |    | .5 |
| 5 | 1 |    |    |    |
| 6 |   |    | 1  |    |

In one embodiment, the link analysis system calculates, for each page and block combination, the importance of a block to a page as the probability of that block being the most important block of the page. The probability of a block not contained on a page being the most important block of that page is zero. The link analysis system may assume that each block contained on a page is most important with equal probability. A page-to-block matrix of probabilities is defined by the following equation:

$$X_{ij} = \begin{cases} 1/s_i & \text{if page } i \text{ contains block } j \\ 0 & \text{otherwise} \end{cases} \quad (2)$$

where $X_{ij}$ represents the probability that block j is the most important block of page i and $s_i$ is the number of blocks on page i.

In one embodiment, the link analysis system calculates a probability that a block is the most important block of a page based on position, size, font, color, and other physical attributes of the block. For example, a large block that is centered in the middle of a page may be more important than a small block in the lower left corner of the page. A technique for calculating block importance and the degree of coherency of blocks is described in U.S. patent application Ser. No. 10/834,639, entitled, "Method and System for Calculating Importance of a Block Within a Display Page" and filed on Apr. 29, 2004, which is hereby incorporated by reference. The page-to-block matrix X may be more generally represented as:

$$X_{ij} = \begin{cases} f_{p_i}(b_j) & \text{if page } i \text{ contains block } j \\ 0 & \text{otherwise} \end{cases} \quad (3)$$

where $f_p^i$ is a function representing the probability that block j is the most important block of page i. In one embodiment, the function $f_p^i$ is defined as the size of block j divided by the distance of the center of the block from the center of the screen when page i is displayed. The function $f$ may be defined by the following:

$$f_{p_i}(b) = \alpha \frac{\text{size of block } b \text{ in page } p_i}{\text{dist. from the center of } b \text{ to the center of screen}} \quad (4)$$

where α is a normalization factor that ensures that the sum of the values of the function for a block is 1. The function f can be considered to be the probability that a user is focused on block j when viewing page i. The page-to-block matrix X for the web pages of FIG. 1 is shown in Table 2. The rows of Table 2 represent the pages and the columns represent the blocks. In this example, the probability that block 4 is the most important block of web page 3 is 0.8.

TABLE 2

|   | 1 | 2 | 3 | 4 | 5 | 6 |
|---|---|---|---|---|---|---|
| 1 | 1 |   |   |   |   |   |
| 2 |   | .5 | .5 |   |   |   |
| 3 |   |   |   | .8 | .2 |   |
| 4 |   |   |   |   |   | 1 |

In one embodiment, the link analysis system calculates, for each block and image combination, the importance of an image to a block as the probability of that image being the most important image of that block. If a block does not contain a certain image, then the probability of that image being the most important of that block is zero. The link analysis system may assume that each image of a block is most important with equal probability. The link analysis system could use other measures of importance of an image to a block, such as based on the relative sizes of the images, the location of the images within the blocks, and so on. A block-to-image matrix of the probabilities is defined by the following equation:

$$Y_{ij} = \begin{cases} 1/s_i & \text{if block } i \text{ contains image } j \\ 0 & \text{otherwise} \end{cases} \quad (5)$$

where $Y_{ij}$ represents the probability that image j is the most important image of block i and $s_i$ is the number of images in block i. The block-to-image matrix Y for the web pages of FIG. 1 is shown in Table 3. The rows of Table 3 represent blocks and the columns represent the images. In this example, the probability that image 2 is the most important image of block 1 is 0.5.

TABLE 3

|   | 1 | 2 | 3 | 4 | 5 | 6 | 7 | 8 | 9 | 10 |
|---|---|---|---|---|---|---|---|---|---|----|
| 1 | .5 | .5 |   |   |   |   |   |   |   |   |
| 2 |   |   | 1 |   |   |   |   |   |   |   |
| 3 |   |   |   | 1 |   |   |   |   |   |   |
| 4 |   |   |   |   | 1 |   |   |   |   |   |
| 5 |   |   |   |   |   | 1 |   |   |   |   |
| 6 |   |   |   |   |   |   | .25 | .25 | .25 | .25 |

In one embodiment, the link analysis system calculates the importance of one page to another page, for each ordered pair of pages, as the probability that a user viewing the first page of the pair will select a link to the second page of the pair. The link analysis system calculates the probability for each pair by summing for each block of the first page the probability of that block being the most important block of the first page times the probability that the second page is the most important page to that block. The importance of a page to another page thus factors in that users may prefer to select links within the most important blocks of page. A page-to-page matrix of these probabilities is represented by the following:

$$W_p = XZ \quad (6)$$

where $W_p$ represents the page-to-page matrix. The probability of W can alternately be represented as:

$$Prob(\beta \mid \alpha) = \sum_{b \in \alpha} Prob(\beta \mid b) Prob(b \mid \alpha) \quad (7)$$

where α represents the first page of the pair and β represents the second page of the pair. The page-to-page matrix $W_p$ for the web pages of FIG. 1 is shown in Table 4. In this example, the probability that a user viewing page 3 will transition to page 2 is 0.4.

TABLE 4

|   | 1 | 2 | 3 | 4 |
|---|---|---|---|---|
| 1 | 0 | .5 | .5 | 0 |
| 2 | 0 | 0 | .5 | .5 |
| 3 | .2 | .4 | 0 | .4 |
| 4 | 0 | 0 | 1 | 0 |

The link analysis system calculates, for each ordered pair of blocks, the importance of one block to another block as the probability that a user viewing the first block of the pair will select a link to the page containing the second block of the pair and will find that second block to be the most important of its page. The link analysis system calculates the probability for each pair by summing the probabilities that a user who selects a link of the first block will select a link for the page that contains the second block times the probability of that second block being the most important block of its page. Thus, the importance of one block to another block represents that a user viewing the first block will select a link to the page containing the second block and focus their attention on the second block. A block-to-block matrix of these probabilities is represented by the following:

$$W_B = ZX \quad (8)$$

where $W_B$ represents the block-to-block matrix. The probabilities of W can alternatively be represented as:

$$W_B(a, b) = Prob(b \mid a) \quad (9)$$
$$= \sum_{\gamma \in P} Prob(\gamma \mid a) Prob(b \mid \gamma)$$
$$= Prob(\beta \mid a) Prob(b \mid \beta)$$
$$= Z(a, \beta) X(\beta, b), \quad a, b \in B$$

The block-to-block matrix $W_B$ for the web pages of FIG. 1 is shown in Table 5. In this example, the probability that a user viewing block 4 will jump to page 2 and focus their attention on block 3 is 0.25.

TABLE 5

|   | 1 | 2 | 3 | 4 | 5 | 6 |
|---|---|---|---|---|---|---|
| 1 | 0 | .25 | .25 | .4 | .1 | 0 |
| 2 | 0 | 0 | .8 | .2 | 0 | 0 |
| 3 | 0 | 0 | 0 | 0 | 0 | 1 |
| 4 | 0 | .25 | .25 | 0 | 0 | .5 |

TABLE 5-continued

|   | 1 | 2 | 3  | 4  | 5 | 6 |
|---|---|---|----|----|---|---|
| 5 | 1 | 0 | 0  | 0  | 0 | 0 |
| 6 | 0 | 0 | .8 | .2 | 0 | 0 |

In one embodiment, the link analysis system factors into the block-to-block matrix the probability that two blocks on the same page may be related. The revised block-to-block matrix is represented by the following:

$$W_B = (1-t)ZK + tDU \quad (10)$$

where D is a diagonal matrix $D_{ii} = \Sigma_j U_{ij}$, U is a coherence matrix, and t is a weighting factor. The matrix U is defined as follows:

$$U_{ij} = \begin{cases} 0 & \text{if block } i \text{ and block } j \text{ are on different pages} \\ DOC & \text{otherwise} \end{cases} \quad (11)$$

where DOC is the degree of coherency of the smallest block containing both block i and block j. The weighting factor t may typically be set to a small value (e.g., less than 0.1) because in most instances different blocks on the same page relate to different topics.

The link analysis system calculates for each ordered pair of images the probability that the first image of the pair is related to the second image of the pair. The link analysis system calculates the probability by summing the block-to-block abilities for the combination of each block that contains the first image to each block that contains the second image. An image-to-image matrix of these probabilities is represented by the following:

$$W_I = Y^T W_B Y \quad (12)$$

where $W_I$ represents the image-to-image matrix. The image-to-image matrix $W_I$ for the web pages of FIG. 1 is shown in Table 6. In this example, the probability that a user viewing block 10 will next view page 3 and focus on block 5 is 0.05.

TABLE 6

|    | 1  | 2  | 3    | 4    | 5   | 6   | 7    | 8    | 9    | 10   |
|----|----|----|------|------|-----|-----|------|------|------|------|
| 1  | 0  | 0  | .125 | .125 | .2  | .05 | 0    | 0    | 0    | 0    |
| 2  | 0  | 0  | .125 | .125 | .2  | .05 | 0    | 0    | 0    | 0    |
| 3  | 0  | 0  | 0    | .8   | .2  | 0   | 0    | 0    | 0    | 0    |
| 4  | 0  | 0  | 0    | 0    | 0   | 0   | .25  | .25  | .25  | .25  |
| 5  | 0  | 0  | .25  | .25  | 0   | 0   | .125 | .125 | .125 | .125 |
| 6  | .5 | .5 | 0    | 0    | 0   | 0   | 0    | 0    | 0    | 0    |
| 7  | 0  | 0  | 0    | .2   | .05 | 0   | 0    | 0    | 0    | 0    |
| 8  | 0  | 0  | 0    | .2   | .05 | 0   | 0    | 0    | 0    | 0    |
| 9  | 0  | 0  | 0    | .2   | .05 | 0   | 0    | 0    | 0    | 0    |
| 10 | 0  | 0  | 0    | .2   | .05 | 0   | 0    | 0    | 0    | 0    |

In one embodiment, the link analysis system factors into the image-to-image matrix the probability that two blocks on the same page may be related. The revised image-to-image matrix is represented by the following:

$$W_I = tDY^T Y + (1-t)Y^T W_B Y \quad (13)$$

where t is a weighting factor and D is a diagonal matrix representing $$D_{ii} = \Sigma_j (Y^T Y)_{ij} \quad (14)$$

The weighting factor t may be set to a large value (e.g., 0.7-0.9) because two images in the same block are likely to be related.

In one embodiment, the link analysis system generates a vector representation of each image from the image-to-image matrix. The link analysis system generates the vectors using a least-squares approach that factors in the similarity between a pair of images as indicated by the image-to-image matrix. The link analysis system initially converts the image-to-image matrix to a similarity matrix represented by the following:

$$S = (W_I + W_I^T)/2 \quad (15)$$

where S represents the similarity matrix. If $y_i$ is a vector representation of image i, then the optimal set of image vectors is $y = (y_1, \ldots, y_m)$ obtained using the following objective function:

$$\min_y \sum_{i,j} (y_i - y_j)^2 S_{ij} \quad (16)$$

If D is a diagonal matrix such that $D_{ii}$ is the sum of the values of the $i^{th}$ row of the similarity matrix S, then the minimization problem reduces to the following:

$$\min_{y^T y = 1} y^T L y \quad (17)$$

where L is equal to D-S. The solution is given by the minimum eigenvalue solution to the general eigenvalue problem:

$$Ly = \lambda y \quad (18)$$

If $(y^0, \lambda^0), (y^1, \lambda^1), \ldots (y^{m-1}, \lambda^{m-1})$ are solutions to Equation 16, and $\lambda^0 < \lambda^1 < \ldots < \lambda^{m-1}$, then $\lambda^0 = 0$ and $y^0 = (1, 1, \ldots, 1)$. The link analysis system selects eigenvectors I through K to represent the images in a k-dimensional Euclidean space. The vector for an image is represented as follows:

$$\text{image } j \leftarrow (y^1(j), \ldots, y^k(j)) \quad (19)$$

where $y^i(j)$ denotes the $j^{th}$ element of $y^i$.

The link analysis system identifies clusters of related images by representing each image by a vector such that the distance between the image vectors represents their semantic similarity. Various clustering algorithms may be applied to the image vectors to identify clusters of semantically related images. These clustering algorithms may include a Fiedler vector from spectral graph theory, a k-means clustering, and so on.

The clustering of images can be used to assist in browsing. For example, when browsing to a web page, a user can select an image and request to see related images. The web pages that contain the images that are clustered together with the selected image can then be presented as the result of the request. In one embodiment, the web pages can be presented in an order that is based on the distance between the image vector of each image and the image vector of the selected image.

The clustering of images can also be used to provide a multidimensional visualization of images that are semantically related. The image vectors can be generated for the images of a collection of web pages. Once the clusters are identified, the system can display an indication of each cluster on a two-dimensional grid representing clusters based on different eigenvectors.

The link analysis system can rank images based on the image-to-image matrix. The image-to-image matrix represents the probability of transitioning from image to image. It is possible that a user will transition to an image randomly. To account for this, the link analysis system generates a probability transition matrix that factors this randomness into the image-to-image matrix as follows:

$$P = \epsilon W + (1-\epsilon) U \tag{20}$$

where P is a probability transition matrix, e is a weighting factor (e.g., 0.1~0.2), and U is a transition matrix of uniform transition probabilities ($U_{ij}$=1/m for all i, j). Because of the introduction of U, the graph is connected and a stationary distribution of a random walk of the graph exists. The rank of an image can be represented as follows:

$$P^T \pi = \pi \tag{21}$$

where $\pi$ is an eigenvector of $P^T$ with eigenvalue 1 representing the image rank. $\pi=(\pi_i, \pi_j, \ldots, \pi_m)$ represents a stationary probability distribution and $\pi_i$ represents the rank of image i.

Figure 2:
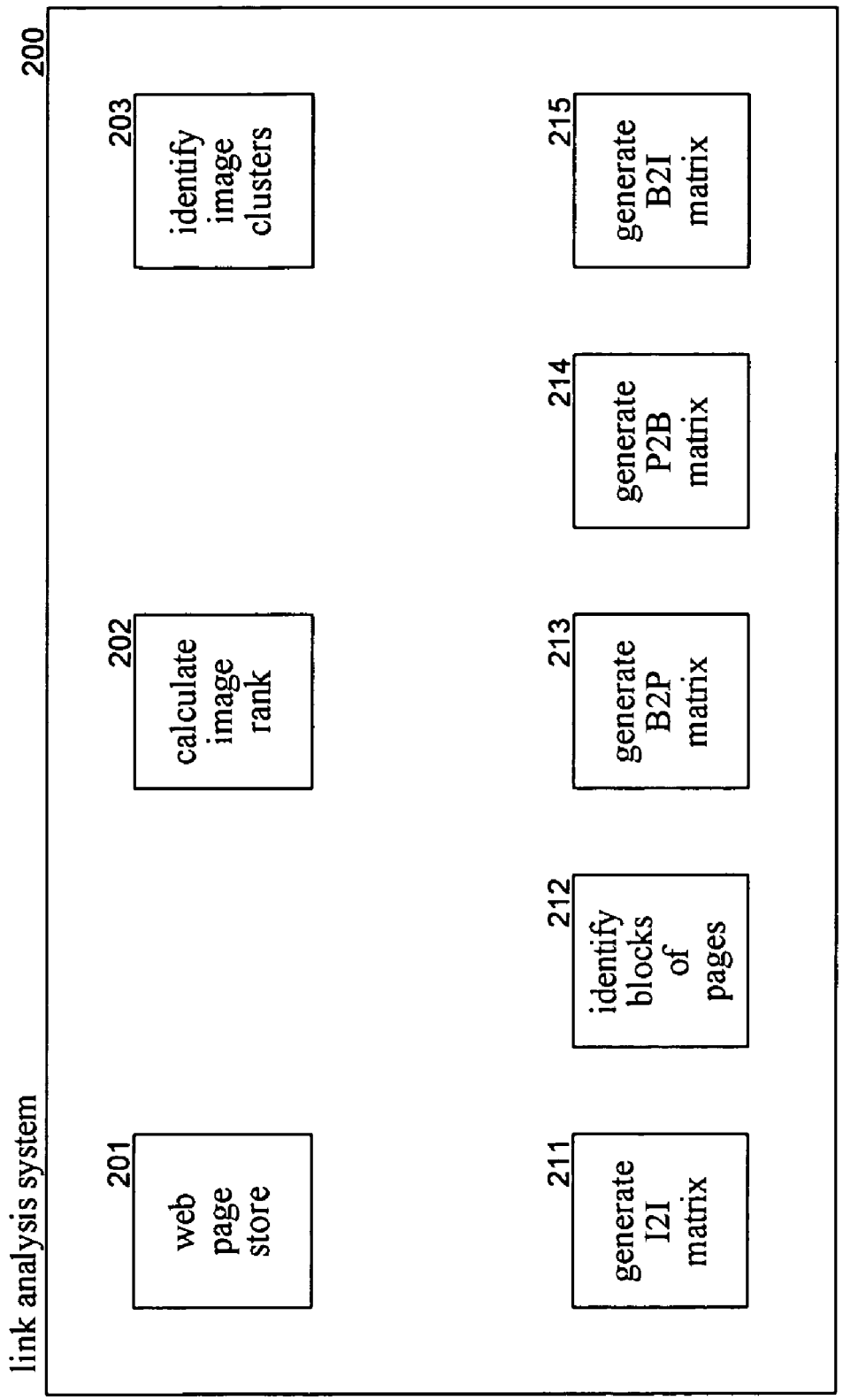
FIG. 2 is a block diagram illustrating components of the link analysis system in one embodiment.

FIG. 2 is a block diagram illustrating components of the link analysis system in one embodiment. The link analysis system 200 includes a web page store 201, a calculate image rank component 202, an identify image clusters component 203, and a generate image-to-image matrix component 211. The generate image-to-image matrix component 211 uses an identify blocks component 212, a generate block-to-page matrix component 213, a generate page-to-block matrix component 214, and a generate block-to-image matrix component 215 to generate a matrix that indicates the image-to-image relatedness. The web page store contains the collection of web pages. The calculate image rank component uses the generate image-to-image component to calculate the relatedness of the images and then uses those calculations of relatedness to rank the images. The identify image clusters component uses the generate image-to-image matrix component to calculate the relatedness of the images, generates a vector representation of the images based on the matrix, and identifies clusters of images using the generated vectors. Although not shown in FIG. 2, the link analysis system may also include a component to calculate ranking elements of a web page other than the images. For example, the link analysis system may apply the rankings of Equations 20 and 21 to the block-to-block matrix to rank the blocks and to the page-to-page matrix to rank the pages themselves.

The computing device on which the link analysis system is implemented may include a central processing unit, memory, input devices (e.g., keyboard and pointing devices), output devices (e.g., display devices), and storage devices (e.g., disk drives). The memory and storage devices are computer-readable media that may contain instructions that implement the link analysis system. In addition, the data structures and message structures may be stored or transmitted via a data transmission medium, such as a signal on a communications link.

Various communications links may be used, such as the Internet, a local area network, a wide area network, or a point-to-point dial-up connection.

FIG. 2 illustrates an example of a suitable operating environment in which the link analysis system may be implemented. The operating environment is only one example of a suitable operating environment and is not intended to suggest any limitation as to the scope of use or functionality of the link analysis system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The link analysis system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 3:
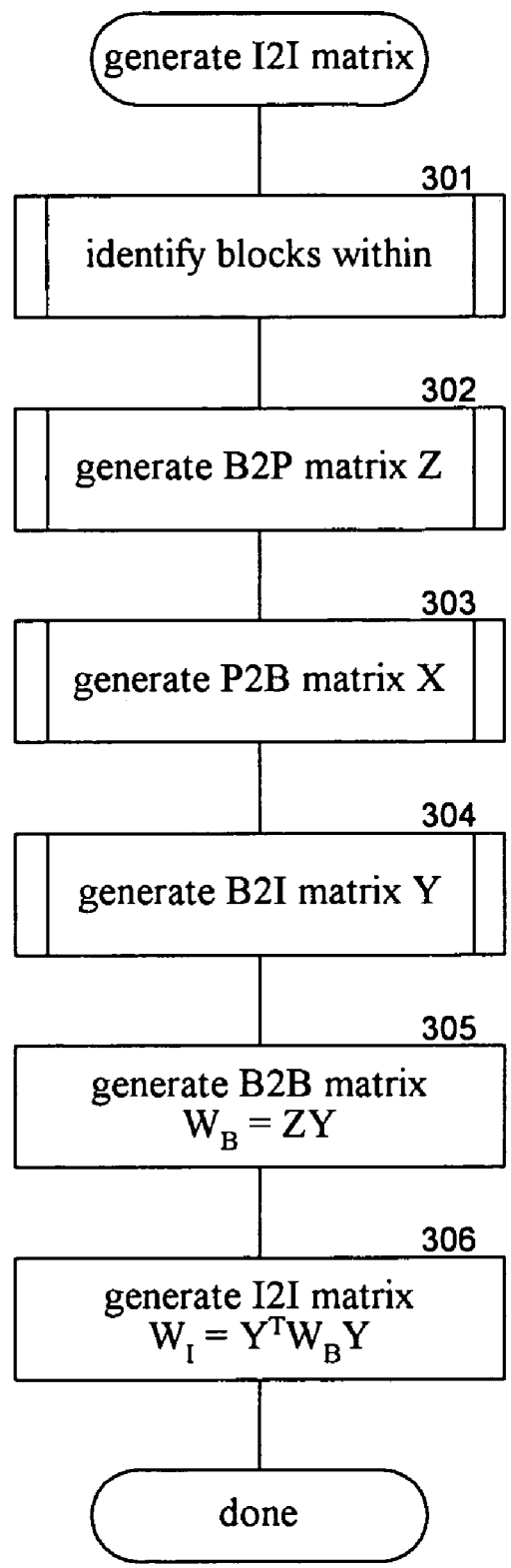
FIG. 3 is a flow diagram that illustrates processing of a generate image-to-image matrix component in one embodiment.

FIG. 3 is a flow diagram that illustrates processing of a generate image-to-image matrix component in one embodiment. In block 301, the component identifies the blocks within the web pages stored in the web page store. In block 302, the component invokes the generate block-to-page matrix component. In block 303, the component invokes the generate page-to-block matrix component.

In block 304, the component invokes the generate block-to-image matrix component. In block 305, the component generates the block-to-block matrix. In block 306, the component generates the image-to-image matrix and then completes.

Figure 4:
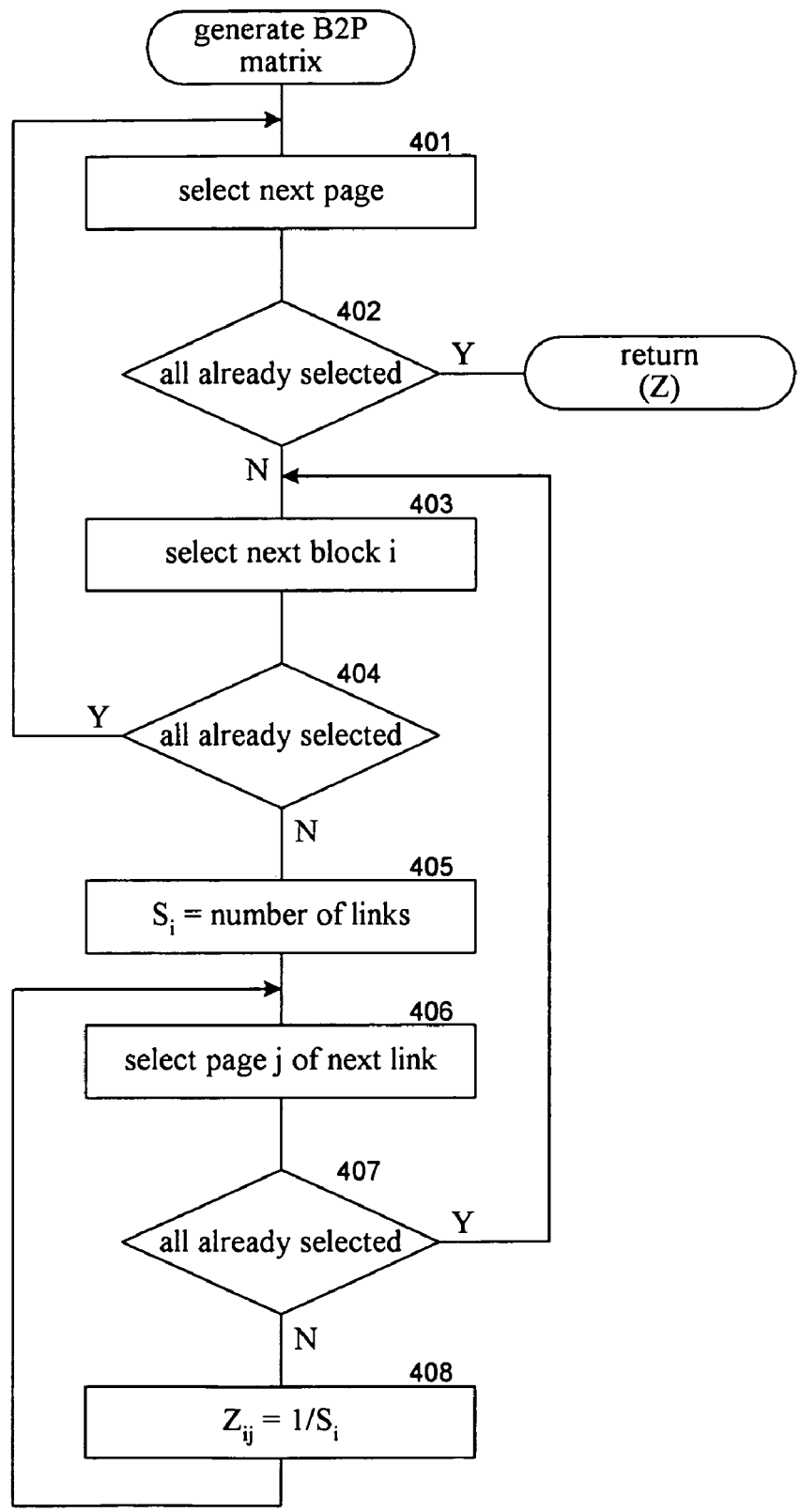
FIG. 4 is a flow diagram that illustrates the processing of a generate block-to-page matrix component in one embodiment.

FIG. 4 is a flow diagram that illustrates the processing of a generate block-to-page matrix component in one embodiment. In blocks 401-408, the component loops selecting each page, each block within each page, and each link within each block and sets the importance of the pages linked to by that link, to that block. In block 401, the component selects the next page. In decision block 402, if all the pages have already been selected, then the component returns the block-to-page matrix, else the component continues at block 403. In block 403, the component selects the next block of the selected page. In decision block 404, if all the blocks of the selected page have already been selected, then the component loops to block 401 to select the next page, else the component continues at block 405. In block 405, the component counts the number of links within the selected block. In block 406, the component selects the linked-to page of the next link of the selected block. In decision block 407, if all the linked-to pages of the selected block have already been selected, then the component loops to block 403 to select the next block, else the component continues at block 408. In block 408, the component sets the importance of the linked-to page to the block and then loops to block 406 to select the linked-to page of the next link of the selected block.

Figure 5:
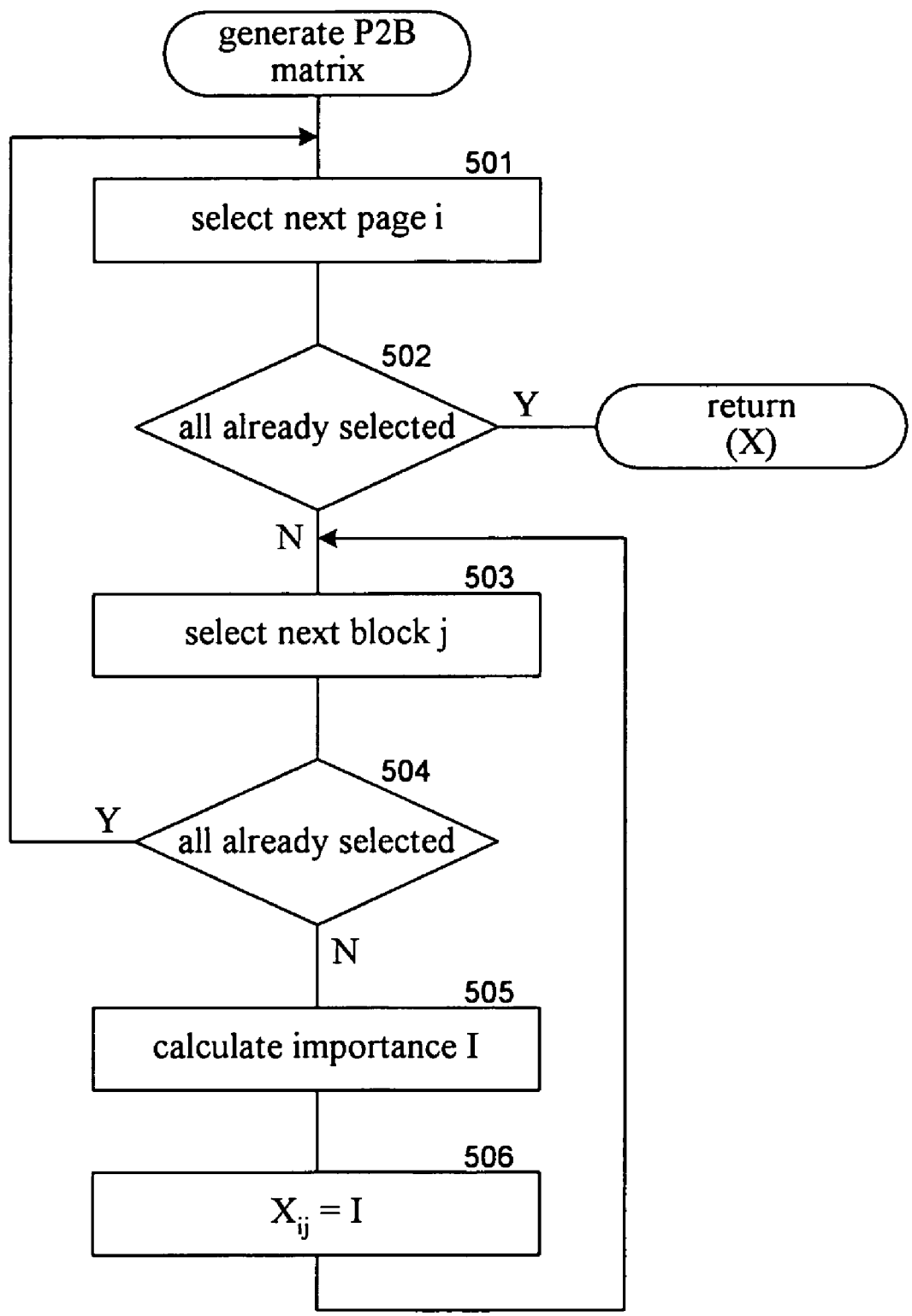
FIG. 5 is a flow diagram that illustrates the processing of a generate page-to-block matrix component in one embodiment.

FIG. 5 is a flow diagram that illustrates the processing of a generate page-to-block matrix component in one embodiment. In blocks 501-506, the component loops selecting each page and each block within each page and setting the importance of that block to the selected page. In block 501, the component selects the next page of the web page store. In decision block 502, if all the pages have already been selected, then the component returns the page-to-block matrix, else the component continues at block 503. In block 503, the component selects the next block of the selected page. In decision block 504, if all the blocks of the selected page have already been selected, then the component loops to block 501 to select the next page, else the component continues at block 505. In block 505, the component calculates the importance of the selected block to the selected page. In block 506, the component sets the importance of the selected block to the selected page and then loops to block 503 to select the next block of the selected page.

Figure 6:
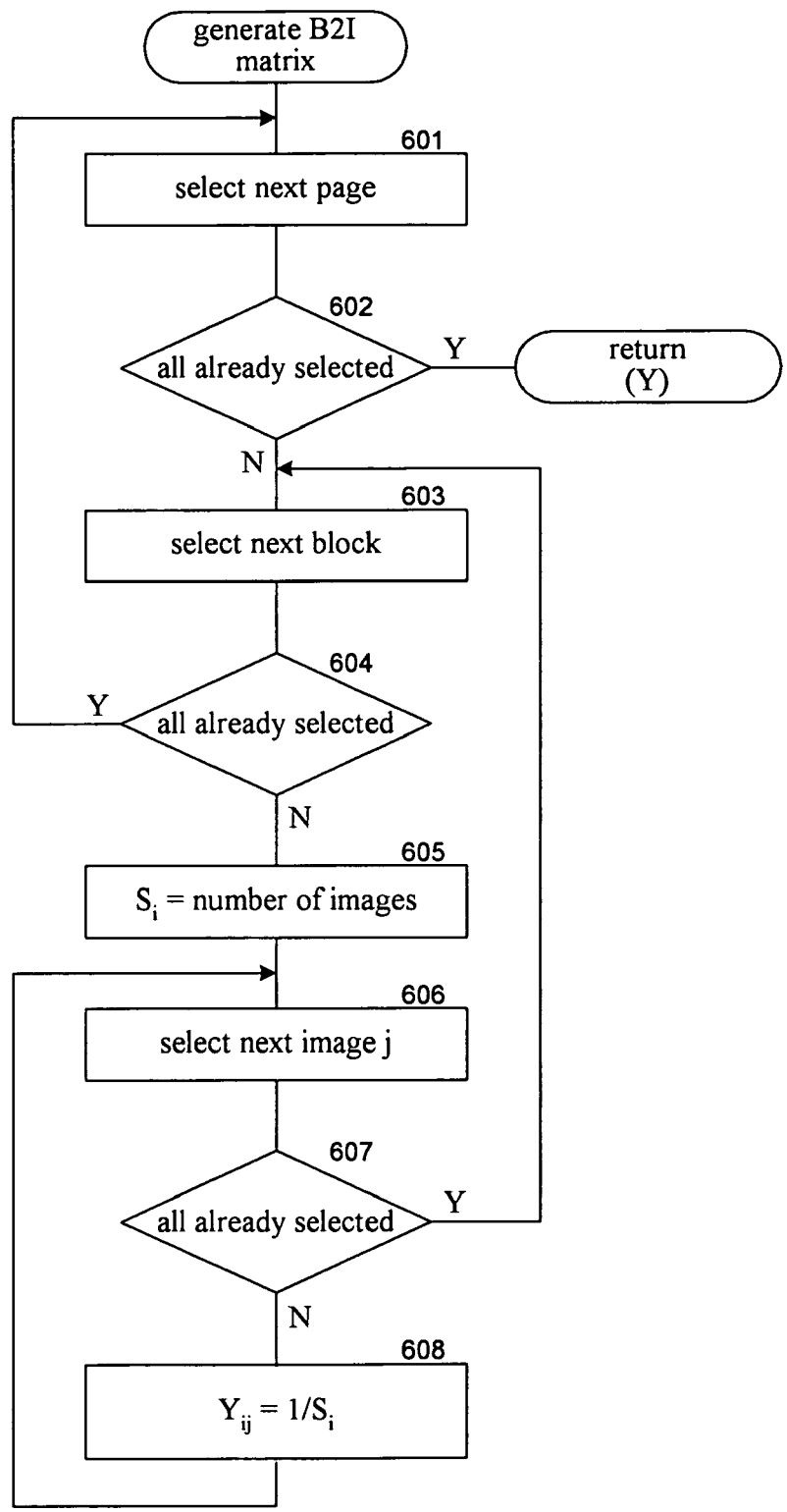
FIG. 6 is a flow diagram that illustrates the processing of a generate block-to-image matrix component in one embodiment.

FIG. 6 is a flow diagram that illustrates the processing of a generate block-to-image matrix component in one embodiment. In blocks 601-607, the component loops selecting each page, each block within each page, and each image within each block and setting the importance of the image to the selected block. In block 601, the component selects the next page of the web page store. In decision block 602, if all the pages have already been selected, then the component returns the block-to-image matrix, else the component continues at block 603. In block 603, the component selects the next block of the selected page. In decision block 604, if all the blocks of the selected page have already been selected, then the component loops to block 601 to select the next page, else the component continues at block 605. In block 605, the component counts the number of images of the selected block. In block 606, the component selects the next image of the selected block. In decision block 607, if all the images of the selected block have already been selected, then the component loops to block 603 to select the next block, else the component continues at block 608. In block 608, the component sets the importance of the selected image to the selected block and then loops to block 606 to select the next image of the selected block.

One skilled in the art will appreciate that although specific embodiments of the link analysis system have been described herein for purposes of illustration, various modifications may be made without deviating from the spirit and scope of the invention. Accordingly, the invention is not limited except by the appended claims.

We claim:

1. A method in a computer system for determining relatedness between images within blocks of pages, the method comprising:
   for each combination of a block and a page, calculating a value indicator for the block to the page;
   for each combination of a page and a block, calculating a value indicator for the page to the block;
   for each combination of an image and a block, calculating a value indicator for the image to the block;
   calculating image-to-image indicators of relatedness of ordered pairs of images by combining the value indicators for the blocks to pages, the value indicators for the pages to blocks, and the value indicators for the images to blocks; and
   storing in a computer-readable medium the calculated image-to-image indicators of relatedness of an image to another image
wherein the value indicator for an image to a block is a probability of a user focusing on the image of the block.

2. The method of claim 1 wherein the value indicator for a page to a block is a probability of a user selecting a link from the block that leads to the other page.

3. The method of claim 1 wherein the value indicator for a block to a page is a probability of a user focusing on the block of the page.

4. The method of claim 1 including calculating a rank of the images from the image-to-image indicators.

5. The method of claim 4 wherein the calculated rank is based on a stationary probability distribution of a user starting at an arbitrary image transitioning to another image.

6. A method in a computer system for determining relatedness between images within block of pages, the method comprising:
   for each combination of a block and a page, calculating a value indicator for the block to the page;
   for each combination of a page and a block, calculating a value indicator for the page to the block;
   for each combination of an image and a block, calculating a value indicator for the image to the block;
   calculating image-to-image indicators of relatedness of ordered pairs of images by combining the value indicators for the blocks to pages, the value indicators for the page to blocks, and the value indicators for the images to the blocks; and
   storing in a computer-readable medium the calculated image-to-image indicators of relatedness of an image to another image
wherein the value indicator for a page to a block is a probability of a user selecting a link from the block that leads to the page, the value indicator for a block to a page is a probability of a user focusing on the block of the page, and the value indicator for an image to a block is a probability of a user focusing on the image of the block.

7. A method in a computer system for determining relatedness between images within blocks of pages, the method comprising:
   for each combination of a block and a page, calculating a value indicator for the block to the page;
   for each combination of a page and a block, calculating a value indicator for the page to the block;
   for each combination of an image and a block, calculating a value indicator for the image to the block;
   calculating image-to-image indicators of relatedness of ordered pairs of images by combining the value indicators of the blocks to pages, the value indicators for the pages to blocks, and the value indicators for the images to the blocks; and
   storing in a computer-readable medium the calculated image-to-image indicators of relatedness of an image to another image
wherein the image-to-image indicators are calculated as follows:

$$W_I = Y^T W_B Y$$

where $W_I$ is a matrix of the image-to-image indicators, Y is a matrix of image-to-block indicators, and $$W_B = ZX$$

where $W_B$ is a matrix of block-to-block indicators, Z is a matrix of the indicators for pages to blocks, and X is a matrix of the value indicators for blocks to pages.

8. A method in a computer system for determining relatedness between images within blocks of pages, the method comprising:
   for each combination of a block and a page, calculating a value indicator for the block to the page;
   for each combination of a page and a block, calculating a value indicator for the page to the block;
   for each combination of an image and a block, calculating a value indicator for the image to the block;
   calculating image-to-image indicators of relatedness of ordered pairs of images by combining the value indicators for the blocks to pages, the value indicators for the pages to blocks, and the value indicator for the images to blocks;
   generating a vector representation of each image based on the image-to-image indicators; and identifying clusters of images based on their vector representations wherein images in a cluster are related wherein the value indicator for an image to a block is a probability of a user focusing on the image of the block.

9. A computer system for determining relatedness between images within blocks of pages, comprising:
- for each combination of a page and a block, a value indicator for the page to the block;
- for each combination of a page and a block, a value indicator for the block to the page;
- for each combination of an image and a block, a value indicator for an image to a block;
- means for calculating image-to-image indicators of relatedness of ordered pairs of images by combining the value indicator for blocks to pages, the value indicators for pages to blocks, and the value indicators for images to blocks; and
- means for calculating the value indicator for an image to a block as a probability of a user focusing on the image of the block.

10. The computer system of claim 9 including means for calculating a value indicator for a page to a block as a probability of a user selecting a link from a block that leads to the page.

11. The computer system of claim 9 including means for calculating a value indicator for a block to a page as a probability of a user focusing on the block of the page.

12. The computer system of claim 9 including means for calculating a rank of the images from the image-to-image indicators.

13. The computer system of claim 12 wherein the calculated rank is based on a stationary probability distribution of a user starting at an arbitrary image transitioning to another image.

14. The computer system of claim 9 including:
- means for generating a vector representation of each image based on the image-to-image indicators; and
- means for identifying clusters of images based on their vector representations wherein images in a cluster are related.

* * * * *